(12) United States Patent
Haas et al.

(10) Patent No.: US 9,638,568 B2
(45) Date of Patent: May 2, 2017

(54) WEIGHT APPARATUS FOR A WAVEGUIDE, PROBE APPARATUS, AND METHOD FOR MANUFACTURING A WEIGHT APPARATUS

(71) Applicant: VEGA Grieshaber KG, Wolfach (DE)

(72) Inventors: Juergen Haas, Oberwolfach (DE); Christian Hoferer, Offenburg (DE); Karl Griessbaum, Muehlenbach (DE)

(73) Assignee: VEGA GRIESHABER KG, Wolfach (DE)

( * ) Notice: Subject to any disclaimer, the term of this patent is extended or adjusted under 35 U.S.C. 154(b) by 231 days.

(21) Appl. No.: 14/572,178

(22) Filed: Dec. 16, 2014

(65) Prior Publication Data

US 2015/0168203 A1    Jun. 18, 2015

(30) Foreign Application Priority Data

Dec. 16, 2013 (EP) .................................... 13197494

(51) Int. Cl.
*G01F 23/284* (2006.01)
*H01P 11/00* (2006.01)
*G01F 23/292* (2006.01)
*G01F 23/288* (2006.01)

(52) U.S. Cl.
CPC .......... *G01F 23/284* (2013.01); *G01F 23/288* (2013.01); *G01F 23/292* (2013.01); *H01P 11/00* (2013.01); *Y10T 29/49016* (2015.01)

(58) Field of Classification Search
CPC ... G01F 23/284; G01F 23/292; G01F 23/2963
See application file for complete search history.

(56) References Cited

U.S. PATENT DOCUMENTS

| 5,661,251 A | 8/1997 | Cummings et al. |
| 6,750,657 B2 * | 6/2004 | Griessbaum ......... G01F 23/284 |
| | | 324/642 |
| 7,367,231 B1 | 5/2008 | Fauveau |

FOREIGN PATENT DOCUMENTS

| DE | 10 2004 035 757 | 5/2006 |
| WO | 03/016835 | 2/2003 |

OTHER PUBLICATIONS

"*Exchange of a cable or rod Probe of Pulscon, LTC,*" Pepperl and Fuchs, www.peperl-fuchs.com, Sep. 13, 2002, 1 sheet.

* cited by examiner

*Primary Examiner* — Paul West
(74) *Attorney, Agent, or Firm* — Fay Kaplun & Marcin, LLP

(57) ABSTRACT

A weight apparatus for a waveguide has a wave resistance. The weight apparatus includes a weight body having a fixing device. The fixing device is adapted to fix the weight body to the waveguide and has a wave resistance which is substantially adapted to the wave resistance of the waveguide.

13 Claims, 4 Drawing Sheets

WEIGHT APPARATUS FOR A WAVEGUIDE, PROBE APPARATUS, AND METHOD FOR MANUFACTURING A WEIGHT APPARATUS

REFERENCE TO RELATED APPLICATIONS

This application claims the benefit of the filing date of European Patent Application Serial No. 13 197 494 filed on 16 Dec. 2013, the disclosure of which is hereby incorporated herein by reference.

TECHNICAL FIELD

The present invention relates to the technical field of measurement technology. In particular, the present invention relates to a weight apparatus, to a probe apparatus, to a method for manufacturing a weight apparatus and to a level measuring instrument.

BACKGROUND OF THE INVENTION

Fill levels can be measured by evaluating reflections or echoes of guided microwaves or guided radar waves. For this purpose, waves or signals propagate along a probe within a container and are reflected when they come into contact with a filling material or with air. These reflections can be identified as echoes in an echo diagram. By surveying the intervals of the echoes obtained during this measurement, the fill level within the container can be determined; in particular, it can be determined whether the container is empty, in other words merely full of air. Generally, a level measurement is carried out when the probe touches the medium or is dipped into the medium. The waveguides used in guided-microwave level measurement are basically cables which are part of a cable probe. A cable probe comprises a tightening weight at one end thereof so as to provide a maximally stable position of the cable probe within the container.

However, the tightening weights used for the tightening may themselves influence the measurement results. Often, they are in the form of solid, substantially cylindrically shaped weights. The weights are basically produced with a view to a high mass, meaning that they often have a large diameter by comparison with the waveguide.

SUMMARY OF THE PRESENT INVENTION

There may be a need to make good measurement of fill levels possible.

Accordingly, a weight apparatus for a waveguide, a probe apparatus, a method for manufacturing a weight apparatus and a level measuring instrument are disclosed.

The subject matter of the invention results from the features of the independent claims. Specific embodiments are given in the independent claims.

In accordance with one aspect of the present invention, a weight apparatus for a waveguide is provided, the waveguide having a wave resistance. In one example, the wave resistance of the waveguide may be determined by the geometry, the shape and material properties thereof. This wave resistance may determine the constructional form and/or the material of a weight apparatus, which is created for connecting to this waveguide in order to tighten the waveguide.

The weight apparatus comprises a weight body, on which a fixing device is provided. The fixing device is adapted to fix the weight body to the waveguide. By way of the fixing device, the weight apparatus can be connected to the waveguide. The fixing device is further adapted in such a way that it has a wave resistance which is substantially adapted to the wave resistance of the waveguide to which the weight apparatus is to be fixed. In one example, the wave resistance of the fixing device or the wave resistance at one end of the weight apparatus may be adapted by way of the shape of the fixing device or by way of the shape of the weight body to the wave resistance of the waveguide to which the weight apparatus is attached or is to be attached. In particular, the wave resistance of the fixing device is adapted in such a way that when the weight apparatus is connected to the waveguide, reflections induced by the fixing device are minimised. Generally speaking, a transition region in which the waveguide guide transitions into the weight apparatus may be referred to as a fixing device. In one example, the waveguide may be a cable or rope, in particular a cable made of an electrically conductive material. In another example, the waveguide and the weight body may consist of a material which may be suitable for conducting thermal or acoustic waves. In particular, if a probe apparatus is manufactured from a single monolithic piece, the fixing region may be a transition region in which there is basically a change in shape from the waveguide to the weight body. In a cable probe, a wave may basically form and propagate between the waveguide and a container wall. In one example, a wave resistance may be determined from the geometry or shape of the waveguide and the container wall. The waveguide and/or the weight body may be understood as an internal conductor and the container wall as the external conductor of a basically coaxial line or coaxial conductor.

Generally speaking, the wave resistance of the fixing device may determine the wave resistance at a first end of the weight body if the fixing device is arranged at the first end. In one example, the fixing device may basically be an opening having a thin wall at the first end of the fixing body. It may be possible to introduce the waveguide into the opening so as to bring about a coupling of the waveguide and the weight body.

In another example, the weight apparatus may be formed from basically the same material as the waveguide. The waveguide may be a cable which carries an electromagnetic wave or an acoustic wave.

In other words, the weight apparatus may be made in such a way that it is possible by way of the weight apparatus or by way of a tightening weight to achieve an impedance match to the waveguide or to the wave guidance device to which the weight apparatus is to be connected.

According to a further aspect of the present invention a probe apparatus is described which comprises the weight apparatus according to the invention and the waveguide, in particular the cable. The waveguide, the wave guidance device or the cable is adapted to guide the wave which is induced in the cable. The weight apparatus is connected to the cable by way of the fixing device.

According to yet another aspect of the present invention a probe apparatus is described which comprises a wave guidance device. The wave guidance device may be formed in one piece or monolithically and basically have two regions, the first region being formed in the shape and/or with the characteristics of a cable having a first diameter and the second region being formed as a weight body having a second diameter. The first diameter may be substantially constant in a propagation direction of a wave along the wave guidance device. The second diameter may basically increase in this propagation direction of the wave. The propagation direction may be understood to be a direction from a transmitter towards the weight body. The transmitter may for example be a TDR (time device reflectometer) sensor. The TDR sensor may be adapted to generate a microwave or a radar signal and to induce it in the wave guidance device and/or the cable. The TDR sensor may also be able to generate an echo diagram from the measured transit times until reflected signals are received. In an example the diameter is continuously increased in the propagation direction and results in a continuous adaptation or match of the wave resistance or a continuous change of the wave resistance. In other words, the wave resistance is adapted or matched in the region of the transition of the cable shaped area to the area which is formed as weight body.

According to a further aspect of the present invention a method for manufacturing the weight apparatus according to the invention is provided. The method comprises connecting the weight apparatus to the waveguide or cable by way of the fixing device. The method further comprises inducing a wave in the waveguide or in the cable. In one example, the method comprises inducing an electromagnetic wave, a microwave or a radar wave.

The method further comprises measuring a reflection caused by the fixing device of the weight apparatus. For this purpose, for example a measurement is carried out in an empty container and the reflection originating from the fixing device or from the transition region is determined. The method further comprises varying the shape of the weight apparatus, it being attempted to minimise the reflection during the variation in shape. To minimise the reflection, the shape of the weight apparatus, in particular the shape of the weight body, is varied until the reflection associated with a fixing device or a transition region has a minimum value or has fallen below a predeterminable threshold. By way of this method, a weight apparatus can be manufactured which is substantially adapted to the wave guidance device or the cable in such a way that when the wave guidance device or waveguide is connected to the weight apparatus, reflections reflected by the transition from the cable end to the weight apparatus are minimal. In other words a weight apparatus can be manufactured which substantially matches the wave guidance device or the cable.

A probe apparatus comprising a weight apparatus produced by the method of manufacture may for example be detected using an echo diagram in which the value for desired echoes, for example the value for a reflection on a filling material, is greater than the value for a reflection caused by the fixing device.

In an additional step, it may also be provided that a probe apparatus is manufactured which integrally contains the wave guidance device and the weight apparatus in such a way that the wave guidance device basically has two distinguishable regions.

According to a further aspect of the present invention a level measuring instrument is described comprising a weight apparatus according to the invention or comprising a probe apparatus according to the invention. The level measuring instrument may measure a fill level of a fluid or a bulk material. However, the level measuring instrument may also be used for measuring a boundary level.

During the propagation of waves, in particular during the propagation of electromagnetic waves, such as microwaves or radar waves, reflections of different strengths may occur at discontinuity locations. The greater the difference in shape or geometry along a short distance in a propagation direction of a wave or signal, the more strongly reflections can be excited. These reflections may interfere in a signal evaluation, since desired or deliberately produced reflections can be covered up or masked by the undesired reflections. The covering can result in the desired reflections for determining a fill level or a probe end not being unambiguously identifiable. Therefore, during wave guidance, continuous transitions or homogeneous transitions should always be produced, and incremental or abrupt variations in the shape or geometry should be avoided. A homogeneous transition may be a continuous widening of a radius in a signal propagation direction.

In a cable probe of the type basically used in level measuring instruments which employ the physical principle of a guided microwave or generally speaking the physical principle of a guided wave, it may be desirable to use a particularly heavy tightening weight. An electromagnetic wave, an acoustic wave or a thermal wave may be used as the guided wave. The wave may also be a modulated signal and only have a limited duration. A signal of limited duration is a pulse. To achieve a large weight which is not inappropriately long, a weight, a weight apparatus or a tightening weight having a large volume and a high density may be used. Nevertheless, for installation in a container, the constructional form may make it necessary to use a body having a large radius perpendicular to a propagation direction of the wave for this tightening weight. In a weight apparatus of this type, a sudden discontinuity may occur at the transition from the wave guidance device or waveguide to the tightening weight. This discontinuity may cause strong reflections.

In one example, a fixing device of a tightening weight or a weight apparatus, in particular an attachment area of a tightening weight to a waveguide, may be matched to the waveguide in such a way that substantially no reflection is induced by this fixing device. For example, a match or an adaptation may be possible by adapting a wave resistance of the fixing device of the weight apparatus to the wave resistance of the waveguide. The wave resistance of the fixing device may be matched to this impedance or to this wave resistance. The waveguides or cables used for cable probes have standardised dimensions. Corresponding weight apparatuses may be provided which are adapted to the standardised dimensions of the waveguides or wave guidance devices.

In accordance with one aspect of the present invention, the fixing device may be arranged on a first end of the weight apparatus. This fixing device may be opposite a second end of the weight apparatus. By contrast with the first end, the second end may have a wave resistance which is less than the wave resistance of the fixing device or less than the wave resistance of the first end. Generally speaking, the second end may have a wave resistance which differs from the wave resistance of the fixing device. In another example, the second end may have a wave resistance which is greater than the wave resistance of the first end. The difference in the wave resistances of the two ends may stem from the attempt substantially to match or adapt the wave resistance at the first end to the waveguide, but substantially not to match the wave resistance at the second end to the surrounding material. The wave resistance at the second end may be selected in such a way that the second end is "untuned", in other words not adapted or matched. In particular, the transition from the first end to the weight body may be less abrupt than the transition from the second end to the surrounding material of the filling material or to the surrounding air. The transition from the first end to the weight body may basically be the transition region from the wave resistance of the waveguide to the wave resistance of the weight body, in particular the transition of the wave resistance from a first end to a region of the weight body positioned between the first end and the second end. In this way, a weight apparatus can be created which, at a fixing device, has a wave resistance or wave impedance matched to a waveguide, whilst the second end comprises a transition to a material which is basically poorly matched. Thus, reflections on the fixing device may be substantially prevented, but reflections on the second end may be provoked or induced. The poor adaptation or match at the second end may basically be caused in that the material of the filling material or the environment into which the second end transitions is not known, and so neither is the wave resistance or wave impedance thereof. It would for example be possible to produce an adaption to air if no filling material were being used. However, this adaptation could result in it no longer being possible to detect the probe end. It may also be hard to predict in what material of filling material the probe will be used, since some probes do not hang in air, but rather in a medium of which the properties are substantially unknown. In one example, however, it may be provided that the material of the weight body is adapted to the material of the filling material to be measured. In this case, there may also be an adaptation or match at the second end, and the probe end may thus, substantially as long as the second end is dipped in the filling material, cause substantially no reflections. To survey or measure the probe end, the filling material would thus for example have to be removed, so as to produce a transition to a different material from the material of the filling material, to which other material the second end is not adapted.

A cable probe comprises both the cable and the weight apparatus. It may be possible to determine the end of the cable probe by way of an incremental or abrupt change in the wave resistance. In other words, it may be possible to make the end of the weight apparatus visible by way of an echo by provoking strong reflections in particular in the region of the end. According to a further aspect of the present invention, the weight body is manufactured at least in part from a material which is matched to the material of the waveguide. The reflection at the transition from the waveguide to the weight body may be caused by the change in the shape, on the one hand, and by differences in material, on the other hand, between the waveguide and the weight body. However, the weight body should be formed in such a way that reflections are substantially prevented and no special interference location is created, in particular at the first end of the weight body. Reflections may basically be prevented by constructional measures such as adapting the shape or material of the weight body.

For example, the material of the weight body may be the same as the material of the waveguide. However, if the material of the waveguide is manufactured from a strongly reflective material, for example steel, it may be expedient, in one example, to manufacture the weight body from another material, for example from a material which does not strongly reflect an electromagnetic wave, such as ceramic, glass or plastics material. A highly reflective material may for example also be a highly conductive material. For example, strong reflections may occur if the material of the weight apparatus is the same material as the material of the waveguide. If in addition there is a location of a discontinuous transition between the weight apparatus and the waveguide, reflections will occur very easily. By contrast, however, correspondingly good reflections may be prevented, in spite of the highly reflective material, if the wave resistances or impedances of the waveguide and of the weight body which can be connected to the waveguide are adapted or matched accordingly.

In one example, the weight body may be manufactured from a material which reflects a wave guided by the waveguide.

According to yet another aspect of the present invention, the fixing device of the weight body can be connected to a cable end.

In one example, the fixing device is a blind hole into which a cable end can be introduced. By means of a fixing screw, a press fit or adhesion, the cable end can be anchored in the blind hole. As a result of the connection of the cable end to the fixing device, a cable probe can be created which basically produces a unit between the waveguide and the weight apparatus. The fixing device may be adapted in such a way that when fixed or in a fixed state it securely fixes the cable end, but only causes slight reflections. In other words, the fixing device may conceal the weight apparatus from the radar beams or the guided microwaves, in such a way that it substantially does not appear as an echo in the echo diagram.

According to another aspect of the present invention, the fixing device comprises an opening having a fixing screw.

The opening may be configured as a through-hole or as a blind hole. By means of the fixing screw, which is arranged perpendicular to a longitudinal axis of the opening or perpendicular to the blind hole, the waveguide can be integrated into the weight body.

According to yet another aspect of the present invention, the weight body is a rotationally symmetrical three-dimensional body.

A rotationally symmetrical body may substantially have the same reflection properties or matching properties in all directions in space, in such a way that substantially the same match or adaptation occurs in all directions. As a result of the use of rotationally symmetrical bodies, discontinuity locations around the waveguide can be prevented.

According to yet another aspect of the present invention, the weight body has a diameter which basically increases in the direction from the first end to the second end. In other words, the diameter increases substantially continuously in a propagation direction of the guided wave prior to reflection at the second end. If the outer surface or the coating surface of the weight body is determined as a function of the length from the first end to the second end, a first derivative of the function has a positive value.

The continuous increase in the diameter of the weight body may make it possible to produce a continuous transition between the waveguide, which can be connected to the weight apparatus, and the weight apparatus, close to the end of the waveguide or at the start of the weight body, i.e. in the region of the fixing device. The increase in the radius towards the second end may simultaneously lead to an increase in the total weight of the weight apparatus. A large weight of the weight apparatus may provide good tightening of a connected waveguide or cable. The heavier the weight, the better the waveguide can be tightened and the less the waveguide can be brought out of the perpendicular by the filling material. The reflections may basically be induced by a substantially abrupt, incremental or stepped change in the wave resistance or impedance along the propagation medium. As a result of the continuous increase in radius of the weight body, the wave resistance may decrease in connection with the production of a poor adaptation or poor match to the filling material or to the air at the second end, starting from the high wave resistance or impedance in the region of the fixing device. Since the wave resistance in the region of the fixing device is substantially adapted or matched to the wave resistance or impedance of the waveguide, the wave resistance at the second end may also be less than the wave resistance of the waveguide.

The increase in radius also serves to reduce the wave resistance at the second end with the aim of worsening the adaptation of the second end of the weight body to the surrounding material or the surrounding air, so as to induce a particularly strong reflection at the probe end. As a result of the continuous increase in radius of the weight body, the wave resistance at the second end may be less than the wave resistance at the first end. In spite of this, because of poor adaptation of the second end to the surrounding material, a strong reflection of the wave propagating along the waveguide and weight body may be caused at the second end. In the case of a guide for an electromagnetic wave, the degree of adaptation of the respective end may be verifiable by way of an impedance measurement.

According to yet another aspect of the present invention, the weight body is of a shape selected from the group of shapes consisting of a frustum shape, a trumpet shape and a drop shape.

All of these shapes have a first fixing device, adapted to the diameter of a cable, and a wide and thus heavy second end. The adaptation of the diameter and the adaptation of the shape of the fixing device to the diameter and shape of the waveguide to be connected may lead not only to a geometric adaptation but also to a signal-related adaptation, in that the wave resistances of the waveguide and the fixing device are adapted to one another.

In another aspect of the present invention, the outer surface of the weight body comprises at least one slit.

The slit can provide a good adaptation or match of the first end of the weight apparatus to the waveguide. The slit may further result in small positive and negative impedance increments occurring, which are spatially so close together that they cancel each other out and can thus improve the adaptation and/or the continuous transition, in addition to the continuous adaptation of the wave resistance by way of the continuous change in shape of the weight body.

According to another aspect of the present invention, the probe apparatus is made of an electrically conductive material. In other words, the probe apparatus may be formed in one piece or monolithically, minimising a discontinuity at the transition between the waveguide and the weight apparatus. Basically, the probe may have homogeneous properties as a result of this measure. The weight body and the waveguide may be integrally connected and thus integrated into one another.

According to yet another aspect of the present invention, the probe apparatus comprises a dielectric core, which is surrounded for example with conductive material. As a result of the construction by means of a dielectric core, the total weight of the probe can be reduced and in spite of this the centre of gravity can be displaced into the probe end so as to tighten the probe.

The level measurement is carried out often, when the probe is dipped into the filling material or touches it. Changes in the echoes also occur when the filling material is merely located in the vicinity of the probe, but these changes are not yet evaluated so as to reach conclusions about the fill level. However, the weight apparatus can also be used for measurements of this type.

It should be noted that different aspects of the invention have been disclosed in relation to different subjects-matter. In particular, some aspects have been disclosed in relation to device claims, whilst other aspects have been disclosed in relation to method claims. However, a person skilled in the art can deduce from the above description and the following description that, unless disclosed otherwise, any combination of features relating to different categories of subjects-matter is considered to be disclosed by this text, as well as any combination of features belonging to one category of subjects-matter. In particular, combinations of features of device claims and features of method claims are intended to be disclosed.

BRIEF DESCRIPTION OF THE DRAWINGS

In the following, further exemplary embodiments of the present invention are disclosed with reference to the drawings.

DETAILED DESCRIPTION OF EMBODIMENTS

Figure 1:
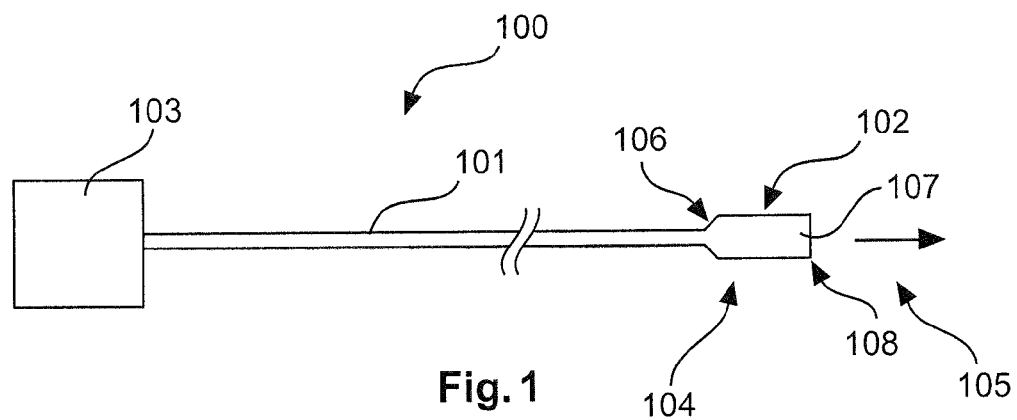
FIG. 1 shows the construction of a probe apparatus, for better understanding of the present invention.

The illustrations in the drawings are schematic and not to scale. In the following description of FIG. 1 to FIG. 12, like reference numerals are used for like or corresponding elements.

FIG. 1 shows a probe apparatus 100, which comprises a waveguide 101 and a weight apparatus 102 in the form of a tightening weight 102, for better understanding of the present invention. The waveguide 101 is formed as a cable 101 or wire cable 101. FIG. 1 shows a measurement arrangement consisting of a TDR sensor 103 and the probe apparatus 100. The TDR sensor 103 may be formed as a generator for electromagnetic, optical, acoustic or thermal waves. Accordingly, the probe apparatus 100 may be formed for transporting the associated waves. Without loss of generality, it may be assumed that the TDR sensor 103 produces electromagnetic waves which move along the cable 101 towards the tightening weight 102. The electromagnetic waves may be continuous or pulsed waves.

In the present text, the terms impedance and resistance, in particular the term wave resistance, may be used equivalently.

The TDR sensor 103 also measures the reflections occurring and returned along the cable probe 100, which in particular are also produced at discontinuity locations or at discontinuity points. To make the reflections visible, the TDR sensor creates an echo diagram in which the reflections are visible as echoes. Desired reflections are brought about or generated by dipping the probe apparatus into a filling material, in particular by dipping the probe end 104 in. Dipping into a filling material produces a discontinuity location as a result of the change in the material properties, which is responsible for the reflection in the region of the fill level.

When installed or in an installed state, the probe end is positioned substantially opposite the TDR sensor 103, spaced apart by the waveguide 101. The dipping into a filling material is not shown in FIG. 1. FIG. 1 shows the probe 100 or probe apparatus 100 in an empty container. The container is also not shown in FIG. 1. The probe end 104 is tightened by the gravity, represented by arrow 105 in FIG. 1, acting on the tightening weight 102. This gravity is generally directed towards the Earth's surface, and in particular towards the base of a filling container.

Tightening weights 102 used in connection with the TDR sensors 103 merely have the object of keeping the cable 101 tight and hanging perpendicular, in so far as possible, by way of the weight thereof. The shape of the tightening weight 102, which in FIG. 1 is shown cylindrical with a discontinuous sudden jump in diameter, results in a strong reflection occurring at the start 106 of the tightening weight 102 or at a first end 106 of the tightening weight 102, in the region of the transition from the cable 101 to the tightening weight 102, in particular to the weight body 107.

Figure 2:
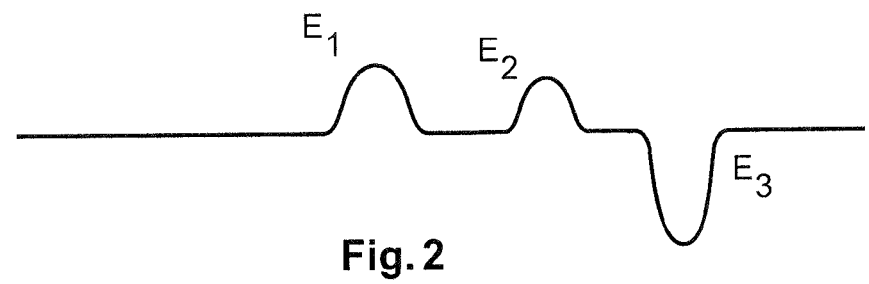
FIG. 2 shows an echo diagram recorded using the probe apparatus of FIG. 1, for better understanding of the present invention.

FIG. 2 shows a reflection diagram or echo diagram recorded using a cable probe 100 of FIG. 1, for better understanding of the present invention. As a result of the large change in impedance between the cable 101 and the weight body 107, an additional echo $E_2$ occurs as well as the desired reflections or desired echoes $E_1$ and $E_3$. The echo $E_1$ is the echo of a filling material when the probe end 104 is dipped in and substantially covered by this filling material. The echo $E_3$ is attributable to the discontinuity location at the second end 108 of the weight body 107. In general, the transition from a small resistance to a larger resistance produces a negative echo. The transition from a large resistance to a smaller resistance produces a positive echo in the echo diagram. As a result of the shape of the weight body, which influences the wave resistance, it can thus be established whether an end of the weight body will be visible as a positive or a negative echo in the echo diagram. In the echo diagram of FIG. 2, a positive echo and a negative echo are distinguished by way of the direction of the deflection. $E_2$ is a positive echo, caused by the transition of the large wave resistance of the waveguide to the small resistance at the first end 106 of the weight 102. $E_3$ is a negative echo caused by the transition from the small wave resistance at the second end 108 to the large resistance of the surrounding material. This transition from the small wave resistance to the large wave resistance leads to the incremental change in resistance at the second end. It is possible to refer to an incremental change in resistance if the length over which a resistance changes is small by comparison with the change in resistance. At the continuous change in resistance between the first end and the second end, the resistance changes over a long region along the weight body. At the second end, there is an abrupt change in resistance. The wave resistance of the second end 108 is smaller than the wave resistance of the first end 106. However, substantially no reflection is produced as a result of the continuous change in resistance within the long region from the first end to the second end.

The echo $E_2$, which is caused by the transition location 106, the first end 106 of the weight body 107 or the fixing device 106 of the weight apparatus 102, additionally occurs. As can be seen from FIG. 2, there is basically no distinction between the reflection or the echo produced by the change in impedance at the transition location 106 and the reflection of the filling material. In particular, the distinction of the shape and height of the echoes $E_1$ and $E_2$ is not easily possible for media or filling materials which cause a similarly strong reflection to the tightening weight itself. Particularly signal processing systems can find it difficult to distinguish the individual reflections $E_1$, $E_2$ or the echoes $E_1$, $E_2$. Even for highly reflective media, such as water, an empty container shows the reflection of the tightening weight, and this can pose difficulties even for complex signal processing algorithms. In other words, this may mean that for highly reflective filling materials such as water a very strong echo from the filling material surface is to be expected. The echo caused by the water surface is desired. A water echo has a higher amplitude $E_1$ than the echo $E_2$ from the interference location, in other words from the transition from the waveguide to the weight body. However, filling or emptying the container can result in the signal processing algorithms mistakenly deciding on the echo $E_2$ as the fill level echo in the absence of the water echo, for example if the surface of the water is located below the tightening weight. The simultaneous occurrence of similar echoes $E_1$, $E_2$ in an echo diagram may pose difficulties even for complex signal processing algorithms if the actual echo to be assigned to the filling material surface is to be determined by evaluating the echo diagram. As a result of the confusion between the echo $E_1$ produced by the filling material and the echo $E_2$ resulting from the reflection at the transition 106, it is even possible for an incorrect fill level to be determined or even for a fill level to be determined when the container is empty. In other words, it is possible for the echo caused by the discontinuity location 106 to be interpreted as a fill level echo which is not present.

Figure 3:
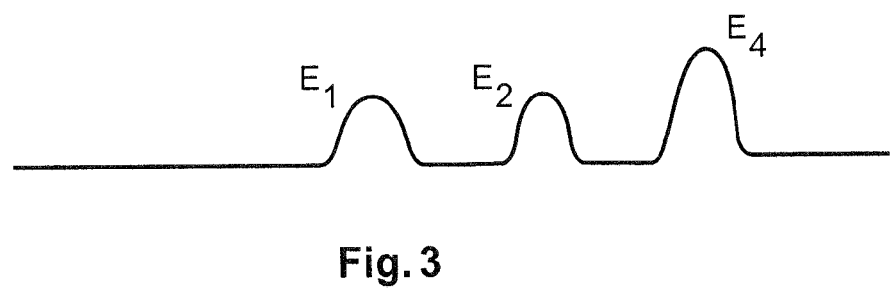
FIG. 3 shows an echo diagram recorded using the probe apparatus of FIG. 1 in interface measurement, for better understanding of the present invention.

FIG. 3 shows an illustration of an echo curve for interface measurement, recorded using the cable probe shown in FIG. 1 for better understanding of the present invention.

The problems of confusing the mistakenly produced echoes at the transition location 106 may lead to incorrect measurement results in particular for interface measurement. In interface measurement, layered filling materials are measured, for example oil on water, and the position of the interface between the two materials is determined. In interface measurement, the aim is to determine the echo of the interface reliably as well as the pure fill level echo. In interface measurement, the reflection of the tightening weight 102 often cannot be distinguished from the reflections induced by the different materials of the interface. For example, the reflection of the oil and the reflection of the water may pose difficulties in detection. In interface measurement using a probe having a discontinuous transition, there are three reflections $E_1$, $E_2$, $E_4$ apart from the echo of the end of the probe. $E_1$ is the echo of the filling material. $E_2$ is the echo of the first end 106, in other words of the transition region 106. $E_4$ is the echo of the interface.

The presence of the three echoes $E_1$, $E_2$, $E_4$ can result in the TDR sensor 103 making an incorrect decision and determining an incorrect fill level and/or an incorrect value for the position of the interface. In FIG. 3, the echo of the tightening weight end 108 is not visible. The reason why the echo of the tightening weight end 108 is not visible may be that this echo is concealed or masked by the echo $E_4$ of the filling material of the interface, for example the echo of the interface between oil and water. If an echo is covered up, the echo $E_4$ may be a very strongly pronounced echo from a highly reflective filling material of the interface. The echoes $E_1$ and $E_2$ of FIG. 2 and FIG. 3 have the same cause; specifically, $E_1$ results from the further interface and $E_2$ from the first end 106. The further interface may be the interface at which a reflection first occurs.

Figure 4:
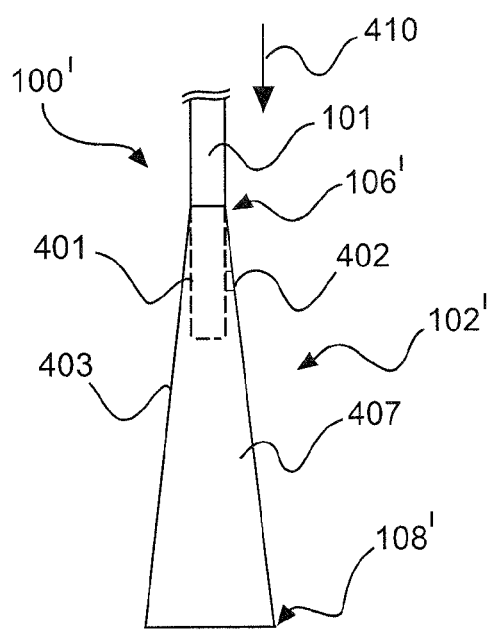
FIG. 4 shows a frustum-shaped weight apparatus in accordance with an exemplary embodiment of the present invention.

FIG. 4 shows a frustum-shaped weight apparatus in accordance with one exemplary embodiment of the present invention. FIG. 4 shows a cable probe 100' which comprises the waveguide 101 or cable 101 and the tightening weight 102' or weight apparatus 102'. The weight apparatus 102' comprises the frustum-shaped weight body 407. The weight body 407 is shown as a rotationally symmetrical solid body having bevelled faces 403. For connection to the waveguide 101, the weight body 407 comprises the blind hole 401 having a fixing screw 402 or having an opening for a fixing screw. The diameter of the blind hole 401 substantially corresponds to the diameter of the waveguide 101, in such a way that the waveguide can be introduced into the blind hole. The outer surface 403 has a linearly increasing radius from the first end 106' to the second end 108'. In the region of the transition from the cable-shaped waveguide 101 to the tightening weight 102', the radius of the frustum 407 has substantially the same diameter as the cable 101, apart from a wall required for the blind hole. As a result, a substantially fluid transition, smooth transition, continuous transition or gentle transition between the waveguide 101 and the weight body 407 is produced. The material of the weight body 407 basically corresponds to the material used for the waveguide 101. In other words, the conductivity of the waveguide 101 has the same value as the conductivity of the material for the weight body 407. As a result of the increase in the material towards the second end 108', the centre of gravity of the weight apparatus 102' is in the lower third of the frustum-shaped weight body 407, in other words in the region of the second end 108'.

A signal propagation direction is indicated by the arrow 410, and generally corresponds to the direction of gravity. The filling container, the filling material into which the probe 100' is dipped, and the TDR sensor which generates and measures the signal 410 are not shown in FIG. 4. The weight body 407 may be formed as a solid material body or else as a hollow body. Since an electromagnetic wave moving along the cable 101 basically propagates on the surface of the cable, it will also basically propagate on the bevelled outer surface 403 on the frustum-shaped weight body 407.

At the second end 108', the transition takes place either to the provided filling material into which the weight body 407 is dipped or to the air of an empty container. This transition is abrupt, in such a way that a strong reflection, which is clearly recognisable on a reflection diagram, is produced at the second end 108'. A reflection diagram of this type is shown for example in FIG. 8. As an alternative to the use of a conductive material for the tightening weight 102', another material may also be used which only has slight reflection properties or substantially no reflection properties. In other words, instead of a conductive material, a ceramic, glass or plastics material may be used for the weight apparatus 102'. If non-conductive materials of this type are used, it is possible basically not to take the shape into account, since the reflection properties of materials of this type are slight. The shape of the weight body 107 can thus for example be made cylindrical with discontinuous transitions, as shown in FIG. 1, since reflections basically only occur at the end of the electrically conductive cable 101.

It may be an aspect of the present invention that the probe 100' at the probe end 106' is adapted or matched to the waveguide 101 by optimising the geometrical or mechanical shape of the tightening weight 102', making it possible to achieve a reduction in interfering reflections.

The impedance adaptation or impedance optimisation at the transition 106' from the waveguide 101 to the weight body 407 may be achieved by way of the external shaping of the tightening weight 102', in particular by way of the shaping of a fixing device in the region of the first end 106'. The interfering reflections induced by the transition location 106' can be reduced or eliminated by way of the better adaptation or match. As a result of the reduction in the reflections, the energy propagation across the transition location 106' can be increased, leading to an increase in amplitude of the reflection at the probe end 108'. This increase in amplitude allows the probe end 108' to be clearly recognisable in an echo diagram.

Figure 5:
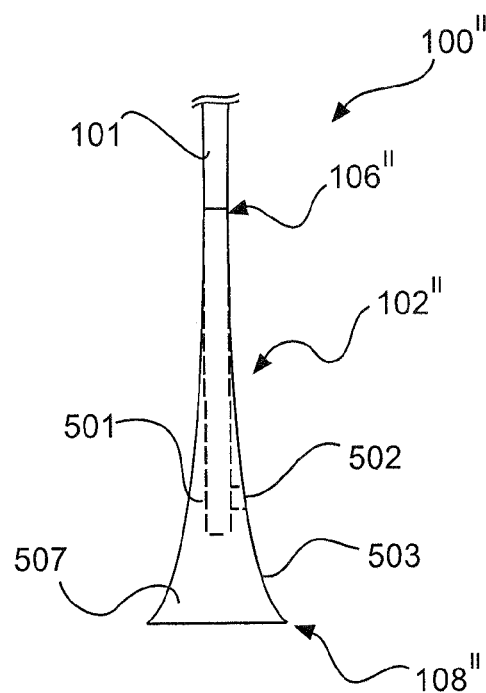
FIG. 5 shows a trumpet-shaped weight apparatus in accordance with an exemplary embodiment of the present invention.

FIG. 5 shows a further weight apparatus in accordance with an exemplary embodiment of the present invention. The shape used in FIG. 5 for the tightening weight 102" is a trumpet shape, the outer surface 503 of which has a substantially exponential or parabolic progression. The weight apparatus 102" comprises the trumpet-shaped weight body 507, which is likewise a rotationally symmetrical body and is formed either as a solid body or as a hollow body. All of the disclosed weight bodies may also be electrical conductors, which are wound around a dielectric body. Together with the waveguide 101, the weight apparatus 102' forms a cable probe 100", which comprises a trumpet-shaped probe end 108". The diameter at the fixing device 106' substantially corresponds to the diameter of the waveguide 101. The waveguide 101 is fixed in the axially arranged blind hole 501 by means of the fixing screw 502. The blind hole 501 in combination with the fixing screw 502 and/or a corresponding opening for the fixing screw form a fixing device which basically has a wave resistance adapted or matched to the waveguide 101 at the transition location 106".

Figure 6:
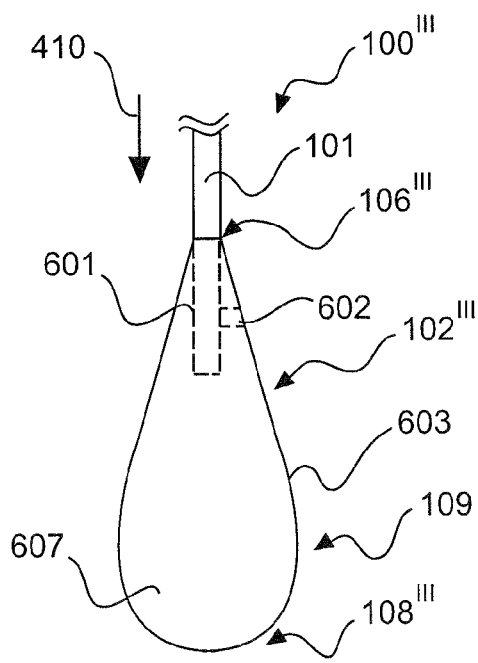
FIG. 6 shows a drop-shaped weight apparatus in accordance with an exemplary embodiment of the present invention.

FIG. 6 shows a drop-shaped weight apparatus in accordance with an exemplary embodiment of the present invention. The drop-shaped weight apparatus 102" comprises the drop-shaped weight body 607 having the outer surface 603, which initially increases with respect to an axis of symmetry in the signal direction 410 and subsequently decreases. The volume thus initially increases greatly in the signal propagation direction and then less greatly. The radius of the weight body initially increases in the propagation direction and subsequently decreases again towards the second end. This drop-shaped weight body 102''' also comprises a narrow transition region at a first end 106'''. The diameter of the fixing device in the region of the first end 106''' substantially corresponds to the diameter of the waveguide 101 to which the drop-shaped weight body 607 can be connected. FIG. 6 shows the drop-shaped weight apparatus 102''' when connected to the waveguide 101 or to the cable 101. As a fixing device, the weight apparatus 102''' also provides a blind hole 601, into which the cable 101 is introduced for fixing and fixed by means of the fixing screw 602 in an opening provided therefore extending perpendicular to the axis of the blind hole 601. The transition region 106', 106'', 106''' may also be referred to as the fixing region 106', 106'', 106''' because of the proximity to the fixing device.

In all of the embodiments shown in FIG. 4-FIG. 6, as an alternative to the fixing screw 602, the waveguide 101 can be connected to the respective weight body 407, 507, 607 by pressing, welding or gluing. The axes of rotation of the rotationally symmetrical weight bodies 407, 507, 607 are substantially coincident with the axis of symmetry of the cable 101.

The cable 101 is an elongately extended cable body of a predetermined diameter. A rod or a similarly elongately formed body which makes it possible to guide a wave or a signal may be used as an alternative to the cable 101. The length of a used waveguide 101 is determined from the container length of a container in which the cable probe 100', 100'', 100''' is to be used. The cables may be standardised and have lengths in the range of 30 cm to 70 m. The diameters of the cables 101 may be 2 mm, 4 mm, 7 mm or 8 mm. The diameters of the weight apparatuses 102', 102'', 102''' at the first ends 106', 106'', 106''' thus also have diameters of approximately 2 mm, 4 mm, 7 mm or 8 mm. By contrast with the conical weight body 407 or frustum-shaped weight body 407 and the trumpet-shaped weight body 507, the drop-shaped weight body tapers again at a second end 108''', in such a way that the thickest region is positioned in the region 109 in the lower third of the weight body 607, before the second end 108''' in a signal propagation direction 410. This drop shape results both in the interference at the start of the body being low and in a good adaptation at the end being achieved, for example for the transition to air. A low adaptation or match at the first end and a good transition to air at the second end may be required in special applications.

A wave resistance of the fixing device in the region of the first end 106', 106'', 106''' has for example a wave resistance of 50Ω or 377Ω. The waveguide 101 and thus also the continuation of the waveguide in the form of the respective weight body 407, 507, 607 form in particular the internal conductor of an entire waveguide, the external conductor of which is formed by the containers (not shown in FIG. 4, FIG. 5 and FIG. 6) in which the cable probes 100', 100'', 100''' are used.

Figure 7:
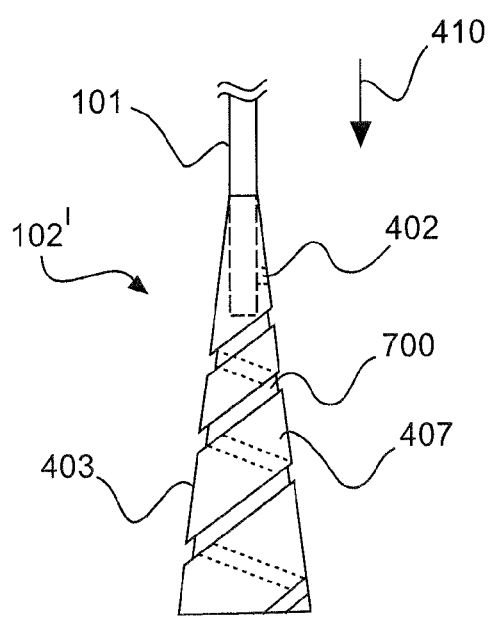
FIG. 7 shows the frustum-shaped weight apparatus of FIG. 4 with a slit on the outer surface of the weight body, in accordance with an exemplary embodiment of the present invention.

FIG. 7 shows the frustum-shaped weight body of the weight apparatus 102' of FIG. 4 having a slit arranged on the outer surface 403. The slit 700 arranged on the outer surface 403 extends around the weight body 407 in a signal propagation direction 410. A slit 700 of this type may be provided in any outer surface 403, 503, 603 of a weight apparatus 102', 102'', 102'''. The slit extends around the body of rotation 407 in a spiral in the signal propagation direction 410 or wave propagation direction. Although FIG. 7 merely shows a slit in the frustum-shaped weight body 407, a slit of this type may also be provided in the trumpet-shaped weight body 503 or the drop-shaped weight body 603 or any other weight body or in particular on the outer surface thereof. The slit should be configured in such a way that no filling material remains hanging and/or sticking therein, this having the potential to lead to additional interferences. For example, the pitch of the slit may be so pronounced that a filling material can easily flow down.

The fixing device basically comprises the blind hole 401, 501, 601 and the opening 402, 502, 602 and the associated fixing screw. In one example, the waveguide 101 has a wave resistance of 50 ohms or 377Ω, in such a way that, in the transition region from the fixing device 401, 402, 501, 502, 601, 602 to the respective first end 106', 106'', 106''', the weight apparatus 102' is formed in such a way that it has a wave resistance of 50Ω, or 377Ω, there too.

Figure 8:
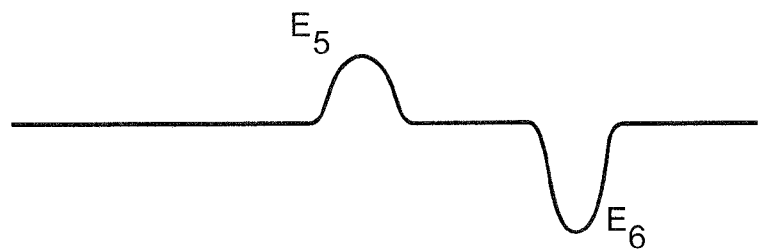
FIG. 8 shows an echo diagram recorded using a probe apparatus of FIG. 4, FIG. 5, FIG. 6, in accordance with an exemplary embodiment of the present invention.

FIG. 8 shows an echo curve recorded using a cable probe 100', 100'', 100''' in accordance with an exemplary embodiment of the present invention. As a result of the use of the tightening weight 102', 102'', 102''' according to the invention, a good adaptation or match of the impedance of the fixing device in the region of a first end 106', 106'', 106''' for a good adaptation or match of the impedance of the weight apparatus 102', 102'', 102''' to the respective waveguide 101 may take place. As a result of the good adaptation or match of the impedances of the waveguide 101 and the weight apparatus 102', 102'', 102''', in particular the fixing device of the weight apparatus 102', 102'', 102''', resulting from the use of this weight shape, reflections induced by the connection of the waveguide 101 to the weight apparatus 102', 102'', 102''' can be minimised. By comparison with the echo diagram of FIG. 2, FIG. 8 merely shows the echo $E_5$ induced by a filling material and the echo induced by the end region 108', 108'', 108''' of the respective weight apparatus 102', 102'', 102'''. An echo due to a discontinuous impedance increment, such as the echo $E_2$ in FIG. 2, cannot be seen. There are thus fewer echoes present to be distinguished. The echo of the end 108', 108'', 108''' of the cable probe can be seen as a negative echo $E_6$ again in the echo diagram. In other words, as a result of the adaptation of the impedance or the wave resistance of the fixing device of the weight apparatuses 102', 102'', 102''' to the wave resistance of the waveguide 101, an echo that would otherwise occur as a result of the connection region 106', 106'', 106''' and the change in impedance brought about by the connection region 106', 106'', 106''' can be reduced. The echo induced by the connection region 106', 106'', 106''' may at least be small enough that it is below a detection threshold of the sensor 103. In this way, this undesired echo is reduced such that it is basically no longer detected by a detector. As a result, the risk of the undesired echo being confused with the echoes $E_5$ and $E_6$ to be detected can be kept low. The undesired echo is therefore not illustrated in FIG. 8. Interference due to an undesired echo is therefore not perceptible to a detector.

Figure 9:
FIG. 9 shows an echo diagram recorded using a probe apparatus of FIG. 4, FIG. 5, FIG. 6, in interface measurement, in accordance with an exemplary embodiment of the present invention.

FIG. 9 shows an echo curve of an interface measurement using a probe which has an adapted or matched weight apparatus, in accordance with an exemplary embodiment of the present invention. The negative echo of the probe end 108', 108'', 108''' is not shown in FIG. 8 or FIG. 9. FIG. 9 merely shows an echo $E_7$ induced by a first interface, for example oil, and a second echo $E_8$ induced by a second interface, for example water.

Since in the cases of FIG. 8 and FIG. 9 an interfering echo induced by the fixing device of a weight apparatus 102', 102'', 102''' is substantially no longer visible, the different reflections $E_5$, $E_6$ or $E_7$, $E_8$ can be distinguished clearly by a signal processing system which evaluates the respective echo curves or reflection diagrams. Clearly distinguishing the desired echoes can increase the reliability of the measurement values and thus the reliability of level measuring instruments when the fill level is being determined.

Figure 10:
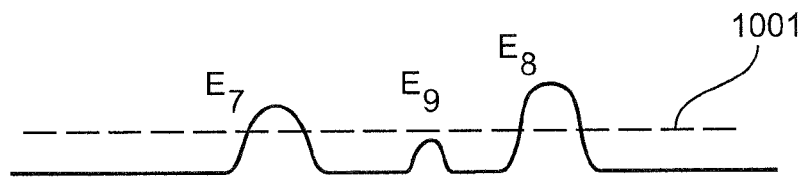
FIG. 10 shows an echo diagram of interface measurement having an interference echo below a detection threshold, in accordance with an exemplary embodiment of the present invention.

FIG. 10 shows an echo curve of an interface measurement having an interference echo below a detection threshold, in accordance with an exemplary embodiment of the present invention. Again, as in FIG. 9, an interface measurement has been carried out in which the echoes $E_7$ and $E_8$ originate from the different interfaces. The echo $E_9$ induced by a fixing device at a first end 106', 106", 106''' of a weight apparatus 102', 102", 102''' is not taken into account by a sensor since it is below a detection threshold 1001 of a TDR sensor.

As a result of the reflections in the transition region 106', 106", 106''' being reduced, more energy reaches the respective probe end 108', 108", 108'''. As a result of the poor adaptation or match of the second end 108', 108", 108''' to the environment, for example to air or to the filling material, this increased amount of energy leads to stronger reflections, in other words to a much more pronounced negative echo $E_6$.

This amplification of an echo at the probe end 108', 108", 108''' may also help to bring about a good measurement result, since reliable detection of the probe end can also be produced. Reliable detection of the probe end can in turn facilitate the allocation of the remaining echoes $E_5$, $E_7$, $E_8$ to the respective fill levels or interfaces. Given knowledge of the length of the probe 100', 100", 100''', in other words the length of the waveguide 101 comprising the probe body 407, 507, 607 or weight body 407, 507, 607, and the properties of a surrounding medium, for example the dielectric constant, it is also possible indirectly to draw a good conclusion as to the fill level. Good detection of the probe end 108', 108", 108''' can also make a good probe end measurement or EOP (end of probe) measurement possible.

A small weight, provided as a result of the narrow diameter in the region of the first end 106', 106", 106''' for adaptation or match of the wave resistances, can be compensated by providing correspondingly wide probe ends 108', 108", 108''', in such a way that the weight of a weight apparatus 102', 102", 102" according to the invention substantially corresponds to the weight of a cylindrical weight body 107, meaning that the tightening of the waveguide 101 is ensured.

Figure 11:
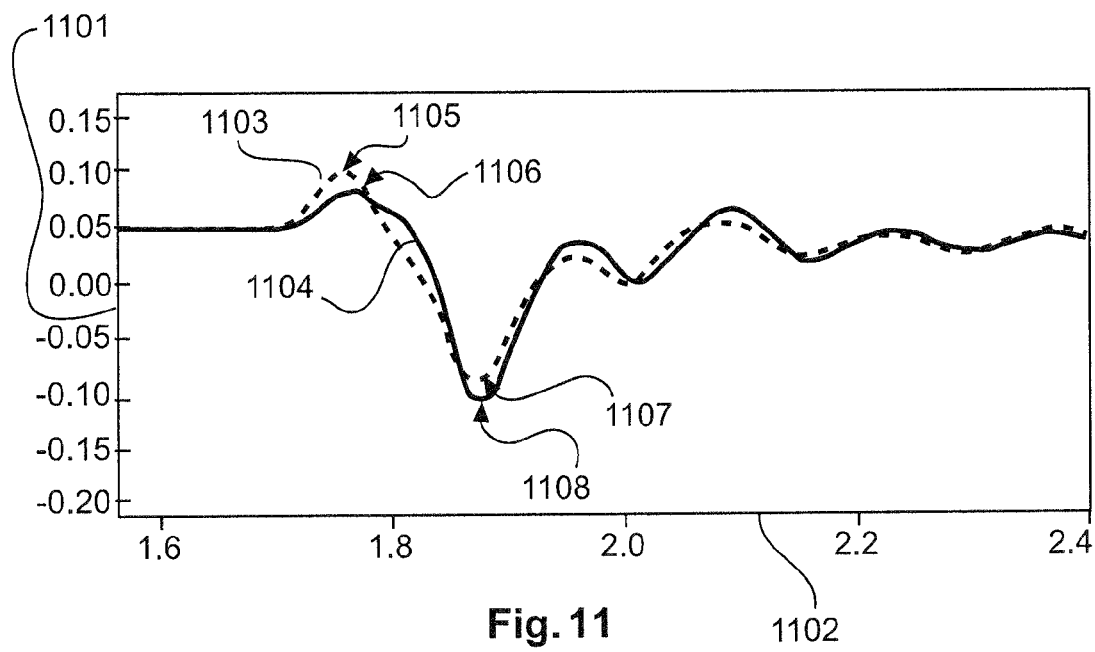
FIG. 11 shows an echo diagram having a comparative measurement of echoes between a probe having a cylindrical tightening weight and having a weight apparatus in accordance with an exemplary embodiment of the present invention.

FIG. 11 is an echo diagram having a comparative measurement of echoes between a probe having a cylindrical tightening weight and a probe having a weight apparatus in accordance with an example embodiment of the present invention. The echo diagram has a y-axis 1101 or ordinate 1101 on which amplitude values of the reflection measurement are plotted in volts. The range shown goes from −0.2 V to +0.15 V. The y-axis 1101 is gradated into steps of 0.05 V. The x-axis 1102 or abscissa 1102 shows the distance from a reference pulse used as a standardised value for the start of a measurement. The gradation of the y-axis is in the unit m (metres) and ranges from 1.6 m to 2.4 m in steps of 0.2 m. The curve 1103 representing the reflection progression of a cable probe having a cylindrical tightening weight 102 and the reflection curve 1104 showing a reflection progression of an echo measurement using the frustum-shaped tightening weight 102' of FIG. 4 are shown. It can be seen that the reflection induced by the transition region is stronger in the case of the cylindrical tightening weight 1105 than when the frustum-shaped tightening weight 1106 is used. The trumpet shape or drop shape leads to similar results. The reflections at the transition region 106', 106", 106''' at the location 1106 are weakened by comparison with the reflections 1105 of the cylindrical tightening weight and thus lead to smaller interferences.

In FIG. 11, it can further be seen that the reflection 1107 at the probe end of a cylindrical tightening weight is smaller than the reflection 1108 of a probe end 108', 108", 108''' when the frustum-shaped tightening weight 102' or a trumpet-shaped tightening weight 102" or a drop-shaped tightening weight 102''' is used. By replacing the cylindrical tightening weight with a frustum-shaped one, the amplitude of the interference reflection 1105, 1106 of the tightening weight 102, 102' can be reduced from approximately 105 mV to 85 mV, in other words by approximately 20%. FIG. 11 shows a measurement in an empty container.

Figure 12:
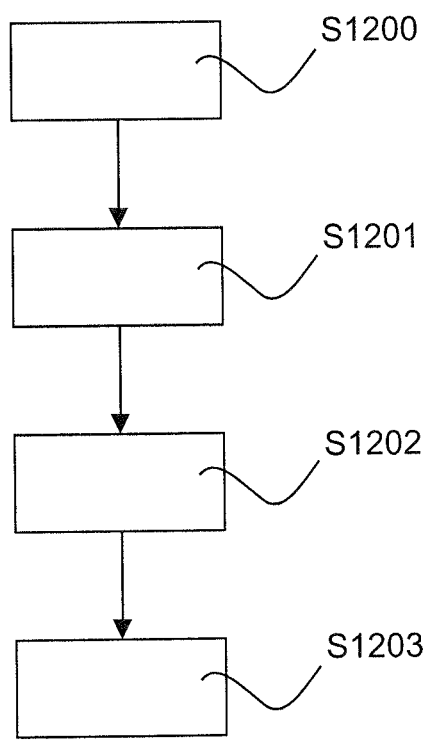
FIG. 12 shows a flow chart for a method for manufacturing a weight apparatus, in accordance with an exemplary embodiment of the present invention.

FIG. 12 shows a flow chart for a method for manufacturing a weight apparatus wherein a waveguide 101 is connected to a weight apparatus 102', 102", 102''', by way of the connection device or fixing device at the first end 106', 106", 106''' in a first method step S1200. In step S1201, a wave, for example an electromagnetic wave or an acoustic wave, is induced in the waveguide 101 towards the weight body 407, 503, 603, in such a way that it propagates towards the probe end 108', 108", 108''', as indicated for example by the arrow 410. In step S1202, the reflection induced by the fixing device 401, 402, 501, 502, 601, 602 and in particular by the first end 106', 106", 106''' is measured. This reflection can be perceived for example as an echo $E_9$. Subsequently, in step S1203, the shape of the weight apparatus 102', 102", 102''' or of the weight body 407, 507, 607, in particular of the first end 106', 106", 106' in the region of the fixing device 401, 402, 501, 502, 601, 602, is changed. As a result in the change in shape, the reflection is minimised until it substantially disappears or comes to be below a detection threshold 1001 of a sensor.

For completeness, it should be noted that "comprising" and "having" do not exclude the possibility of other elements or steps, and "one" or "a" does not exclude the possibility of a plurality. It should further be noted that features or steps which have been disclosed with reference to one of the above embodiments may also be used in combination with other features or steps of other above-disclosed embodiments. Reference numerals in the claims should not be treated as limiting.

The invention claimed is:

1. A weight apparatus for a waveguide having a wave resistance, comprising:
   a waveguide in form of a cable; and
   a weight body having a fixing device;
   wherein the fixing device fixes the weight body to the waveguide;
   wherein the weight body is disposed at one end of the cable and tightens the cable by gravity acting on the weight body;
   wherein the fixing device has a wave resistance which is substantially matched to the wave resistance of the waveguide; and
   wherein the weight body is of a shape selected from the group of shapes consisting of a frustum shape, a trumpet shape and a drop shape.

2. The weight apparatus according to claim 1, wherein the fixing device is arranged at a first end of the weight apparatus which is opposite a second end of the weight apparatus; and wherein the second end has a wave resistance which is less than the wave resistance of the fixing device.

3. The weight apparatus according to claim 2, wherein the weight body has a diameter which basically increases in the direction from the first end to the second end.

4. The weight apparatus according to claim 1, wherein the weight body is manufactured at least in part from a material which is matched to a material of the waveguide.

5. The weight apparatus according to claim 1, wherein the fixing device is connected to a cable end.

6. The weight apparatus according to claim 1, wherein the fixing device comprises an opening having a fixing screw.

7. The weight apparatus according to claim 1, wherein the weight body is a rotationally symmetrical three-dimensional body.

8. The weight apparatus according to claim 1, wherein the outer surface of the weight body comprises at least one slit.

9. A probe apparatus, comprising:
- a wave guidance device;
- wherein the wave guidance device has first and second regions, the first region being formed in a shape of a cable having a first diameter; the second region being formed as a weight body having a second diameter; the first diameter being substantially constant in a propagation direction of a wave; the second diameter increasing in the propagation direction of the wave such that the diameter continuously increases in the propagation direction and the wave resistance is continuously matched,
- wherein the weight body is disposed at one end of the cable and tightens the cable by gravity acting on the weight body, and
- wherein the weight body is of a shape selected from the group of shapes consisting of a frustum shape, a trumpet shape and a drop shape.

10. The probe apparatus according to claim 9, wherein the probe apparatus is made of an electrically conductive material.

11. The probe apparatus according to claim 9, further comprising:
- a dielectric core.

12. A level measuring instrument, comprising:
- an apparatus including one of (a) a weight apparatus according to claim 1, and (b) a probe apparatus according to claim 9.

13. A method for manufacturing a weight apparatus for a waveguide having a wave resistance, the weight apparatus including a waveguide in form of a cable, a weight body which has a fixing device, the fixing device fixing the weight body to the waveguide, wherein the weight body is disposed at one end of the cable and tightens the cable by gravity acting on the weight body; the fixing device having a wave resistance which is substantially matched to the wave resistance of the waveguide, and wherein the weight body is of a shape selected from the group of shapes consisting of a frustum shape, a trumpet shape and a drop shape, the method comprising:
- connecting the weight apparatus to a waveguide;
- inducing a wave in the waveguide;
- measuring a reflection caused by the fixing device of the weight apparatus;
- changing a shape of the weight apparatus and thus minimising the reflection.

* * * * *